(12) United States Patent  
Crane

(10) Patent No.: US 8,258,760 B2  
(45) Date of Patent: Sep. 4, 2012

(54) EXCITER ASSEMBLIES

(75) Inventor: Allan David Crane, Warwickshire (GB)

(73) Assignee: Converteam UK LTD, Warwickshire (GB)

( * ) Notice: Subject to any disclaimer, the term of this patent is extended or adjusted under 35 U.S.C. 154(b) by 0 days.

(21) Appl. No.: 13/106,368

(22) Filed: May 12, 2011

(65) Prior Publication Data

US 2011/0227544 A1  Sep. 22, 2011

Related U.S. Application Data

(62) Division of application No. 11/885,085, filed on Nov. 26, 2008, now Pat. No. 7,969,123.

(30) Foreign Application Priority Data

Feb. 24, 2005 (GB) .................................. 0503800.5  
Feb. 13, 2006 (WO) ................ PCT/GB2006/000489

(51) Int. Cl.  
*H02K 9/00* (2006.01)

(52) U.S. Cl. .............................. 322/100; 322/89; 322/99

(58) Field of Classification Search .................... 322/89, 322/37, 59, 99, 100  
See application file for complete search history.

(56) References Cited

U.S. PATENT DOCUMENTS

| 2,053,889 | A | | 9/1936 | Allen |
| 4,110,669 | A | * | 8/1978 | Akamatsu ..................... 318/700 |
| 6,420,842 | B1 | | 7/2002 | Gold |
| 6,489,701 | B1 | * | 12/2002 | Gamble et al. ................ 310/179 |
| 6,791,216 | B2 | * | 9/2004 | Kalsi ................................ 310/52 |
| 6,828,919 | B1 | * | 12/2004 | Gold ........................ 340/870.29 |
| RE38,790 | E | * | 9/2005 | Maeda et al. ............... 290/40 C |
| 7,355,367 | B2 | | 4/2008 | Sarlioglu et al. |
| 7,863,868 | B2 | | 1/2011 | Xu et al. |
| 7,969,123 | B2 | * | 6/2011 | Crane ............................. 322/89 |

FOREIGN PATENT DOCUMENTS

| JP | 03272107 | 12/1991 |
| JP | 04-054820 | 2/1992 |
| JP | 04038119 | 2/1992 |
| JP | 10270234 | 10/1998 |
| JP | 2003 339161 | 11/2003 |

* cited by examiner

Primary Examiner — Nicholas Ponomarenko  
(74) Attorney, Agent, or Firm — Kirschstein, et al.

(57) ABSTRACT

An exciter assembly for supplying a field current to the rotor windings of a superconducting synchronous machine includes a pulse transformer having a stationary primary winding, a secondary winding and a tertiary winding. A switched mode power supply supplies a pulsed voltage to the primary winding of the pulse transformer. The pulsed voltage developed at the secondary winding of the pulse transformer is supplied to the rotor windings through a pair of transfer leads. A controller controls synchronous rectification of the pulsed voltage supplied to the rotor windings based on a signal from the tertiary winding of the pulse transformer.

9 Claims, 11 Drawing Sheets

EXCITER ASSEMBLIES

CROSS REFERENCE TO RELATED APPLICATION

This application is a division of U.S. patent application Ser. No. 11/885,085, filed Nov. 26, 2008, now U.S. Pat. No. 7,969, 123 now allowed. This application claims foreign priority PCT/GB2006/000489, filed on Feb. 13, 2006.

FIELD OF THE INVENTION

The present invention relates to exciter assemblies, and in particular to exciter assemblies for supplying current to the rotor windings of a superconducting synchronous machine.

BACKGROUND OF THE INVENTION

It is normal for the rotor of a superconducting synchronous machine to be located inside a cryogenic chamber (often called a cryostat) so that the superconducting material that is used in the rotor windings can be maintained below its critical superconducting temperature. For a high temperature superconducting (HTS) material such as BSCCO-2223 ($Bi_{(2-x)}$ $Pb_xSr_2Ca_2Cu_2O_{10}$) or YBCO ($YBa_2Cu_3O_{7-\delta}$) the temperature in the cryostat can be anywhere between 27 and 110 K. The rest of the superconducting synchronous machine will remain at an ambient temperature of about 300 K. For the purposes of this patent specification, the term "cold environment" will be used to refer to the low temperature environment inside the cryostat and the term "warm environment" will be used to refer to the ambient temperature environment outside the cryostat.

It is essential for the operation of the superconducting synchronous machine that the rotor windings are excited by supplying them with a field current. In a typical superconducting synchronous machine the full field current is supplied to the rotor windings through a pair of transfer leads that pass from the warm environment to the cold environment through a wall of the cryostat. The field current is provided by a power supply and can be supplied to the transfer leads using a pair of slip rings and brush contacts. The transfer leads are designed to minimise the stray heat transfer between the warm environment and the cold environment to reduce any possible adverse impact on the performance requirements of the cryogenic cooling system. However, the transfer leads must also have a significant cross sectional area if they are to carry the full field current, which may be between ten and two thousand amperes. Increasing the cross sectional area also increases the amount of stray heat transfer through the transfer leads. Therefore, in practice, the design of the transfer leads must be a compromise between the need to maximise the current carrying capacity whilst at the same time trying to minimise stray heat transfer.

U.S. Pat. No. 6,420,842 describes an exciter assembly for supplying a field current to the rotor windings of a superconducting synchronous machine. The exciter assembly includes a transformer 106 having a primary winding 108 and a secondary winding 112. The primary winding 108 receives current from an ac power source 110 that is preferably a high frequency excitation source (e.g., 400 Hz to 2 kHz). The transformer 106 is therefore fed by a switched mode power supply. In practice, it will be readily appreciated that the transformer 106 may or may not be a pulse transformer depending on whether or not the switched mode power supply is filtered.

An ac voltage is supplied from the secondary winding 112 to a full wave bridge rectifier 114 whose dc output is supplied to storage capacitor 116. The dc voltage across the storage capacitor is not described as being regulated in any particular way. The dc voltage is converted to a switched mode regulated current that flows in field winding 102 by rotating semiconducting power devices 120, 122 and 138 which can either be located in a cryogenic environment or a warm environment as required. When the rotating semiconductor power devices 120, 122 and 138 are located in a cryogenic environment, a pulsed current flows in the transfer leads that pass between warm and cryogenic environments. When the rotating semiconductor power devices 120, 122 and 138 are located in a warm environment, a substantially non-pulsing current flows in the transfer leads that pass between warm and cryogenic environments. In both cases, the switched mode regulator power semiconductor devices are in a rotating environment and carry field current. A field current regulation process using a telemetry link comprising stationary machine controller interface 134 and a rotating field coil controller interface 130 that employ pulse code modulated carrier infrared optical transmission and reception in order to bi-directionally transfer regulator signals between stationary and rotating environments. A current sensor 132 is located in the rotating environment and it is necessary to transfer data from this sensor via the telemetry link to enable closed loop regulation of field current to be performed.

Accordingly, there is a need for an alternative exciter assembly that does not require switched mode regulator power semiconductor devices and a field current transducer to be in a rotating environment and for these to have to communicate with the stationary environment in order to enable closed loop regulation of field current to be performed.

SUMMARY OF THE INVENTION

The present invention provides an exciter assembly for supplying a field current to the rotor windings of a superconducting synchronous machine, the exciter assembly comprising:
  a pulse transformer having a primary winding and a secondary winding;
  a switched mode power supply for supplying a pulsed dc current to the primary winding of the pulse transformer; and
  a pair of transfer leads for supplying a pulsed dc current from the secondary winding of the pulse transformer to the rotor windings.

The rotor windings will be located in a cryogenic region of the superconducting synchronous machine, such as inside a cryogenic chamber or cryostat. The cryogenic region will be referred to below as the "cold environment".

The primary winding of the pulse transformer is preferably stationary and the secondary winding of the pulse transformer preferably rotates in use. Both the primary and secondary windings of the pulse transformer, as well as the switched mode power supply, are preferably located in the "warm environment" outside the cryogenic region. The transfer leads are used to transfer the pulsed dc current between the warm environment and the cold environment, usually through a wall of the cryogenic chamber or cryostat.

The field current is preferably provided by a switched mode power supply having a significant forcing voltage so that, at start up, a working field current can be established in the rotor windings in a relatively short period of time. During normal operation of the superconducting synchronous machine, the transfer leads will only carry the field current for a small proportion of the time.

The exciter assembly preferably further comprises a rectifier semiconductor device in series with the rotor winding and a flywheel semiconductor device in parallel with the rotor winding. The rectifier semiconductor device can be a thyristor, a Gate Turn Off Thyristor (GTO) or other device with similar reverse blocking and gate turn on characteristics. The flywheel semiconductor device can be a Junction Field Effect Transistor (JFET) or Vertical Junction Field Effect Transistor (VJFET), for example. The JFET and VJFET devices do not suffer from the presence of the parasitic body diode that is an inherent feature of Metal Oxide Silicon Field Effect Transistors (MOSFETs) and the silicon carbide derivatives thereof. Because they do not have a parasitic body diode, JFET and VJFET devices are able to block voltages of both polarities under gate control. Moreover, JFET and VJFET devices do not suffer the reverse recovery performance limitations that are imposed by parasitic body diodes of other devices.

The rectifier semiconductor device and the flywheel semiconductor device are preferably controlled for synchronous rectification of the pulsed voltage supplied to the rotor windings. In contrast to the exciter assembly disclosed in U.S. Pat. No. 6,420,842, the synchronous rectification is controlled by an electronic controller, which uses a timing signal taken from a tertiary winding of the pulse transformer and supplies gate pulses to the rectifier semiconductor device and the flywheel semiconductor device to turn them on and off at appropriate times.

The exciter assembly preferably further comprises a snubber including an inductor in series with the rotor windings and a capacitor in parallel with the rotor windings.

To protect the rotor windings from damage in the event that incipient quench occurs (i.e. the superconducting material forming the rotor windings starts to become locally resistive either because the temperature rises above the critical temperature or the current density rises above the critical current density or because of a winding defect, for example) the switched mode power supply can be switched off and a switchable means including a field discharge resistor (sometimes called a dump resistor) can be employed in series with the rotor windings in order to force the field current down. The dump resistor is preferably in series with a semiconductor switch device such as a thyristor, Gate Turn Off Thyristor (GTO) or other device with similar reverse blocking and gate turn on characteristics, for example. Synchronous rectification should also be inhibited if incipient quench is detected by turning off both the rectifier and flywheel semiconductor devices. Mechanical means for the passive protection of the rotor windings may also be provided. For example, metallic buffer layers may be deposited over High Temperature Superconductor (HTS) films in order to provide a conventional electrically and thermally conductive material that is intimate contact with the HTS films. It is essential that the respective responses of these passive protection means, the incipient quench detection system and the dump resistor switching device are co-ordinated in order to provide effective protection against incipient quench.

The controller preferably controls the operation of the semiconductor switch device, and optionally the rectifier and flywheel semiconductor devices, based on a current feedback signal indicative of the field current in the rotor windings during a first period of time when a pulse of voltage is supplied to the rotor windings and a voltage feedback signal indicative of the voltage across the rotor windings during a second period of time when a pulse of voltage is not being supplied to the rotor windings.

The current feedback signal can be derived from a current transducer in series with the primary winding of the pulse transformer and the voltage feedback signal can be derived from a voltage transducer in parallel with the rotor windings.

The rotor windings are preferably formed from an HTS material such as BSCCO or YBCO, for example. Other possible HTS materials include members of the rare-earth-copper-oxide family. It will be readily appreciated that the superconducting field windings can also be formed from a Low Temperature Superconducting (LTS) material such as $Nb_3Sn$ and NbTi or a Medium Temperature Superconducting (MTS) material such as $MgB_2$ (magnesium diboride).

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
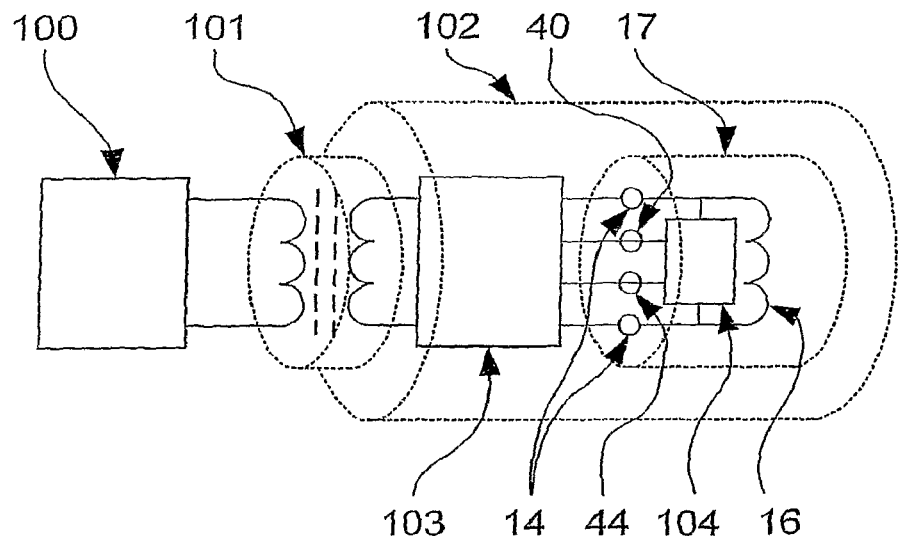
FIG. 1 is a schematic diagram showing the topology of an exciter assembly according to the present invention in outline.

The basic topology and operation of an exciter assembly according to the present invention will now be explained with reference to FIG. 1. The exciter assembly includes a switched mode power supply 100 that is located at ambient temperature on, or near to, the stator of a superconducting synchronous machine (the "machine"). The exciter assembly also includes a pulse transformer 101 and a first power assembly 103 that are located at ambient temperature.

The output of the switched mode power supply 100 is connected to the primary winding of the pulse transformer 101. The secondary winding of the pulse transformer 101 is connected to the first power assembly 103. The primary winding remains stationary while the secondary winding and the power assembly 103 are secured to the rotor 102 of the machine and rotate with it. Field current is supplied from the first power assembly 103 to a second power assembly 104 that is located inside the cryostat 17 using a pair of transfer leads 14 which pass through a wall of the cryostat.

The second power assembly 104 controls the circulation of the field current (commonly known as flywheel action) in the rotor windings of the machine, represented in FIG. 1 by a field winding 16, when the first power assembly 103 is not supplying current to the second power assembly and the field winding. The rotor windings are formed from a High Temperature Superconducting (HTS) material such as BSCCO-2223 or YBCO wires and tapes. BSCCO wire is made from $(Bi,Pb)_2Sr_2Ca_2Cu_3O_{10}$ filaments in a metal matrix and has a critical temperature of 110 K but typically operates in motors and generators at less than 40 K. YBCO wires or tapes could operate at higher temperatures in a motor or generator. YBCO as thin film could be directly deposited on a machine rotor. One possible supplier of BSCCO-2223 or YBCO wire is American Superconductor (AMSC), HTS Wire Manufacturing Facility of Jackson Technology Park, 64 Jackson Road, Devens, Mass. 01434-4020, United States of America.

The switched mode power supply 100 supplies a pulsed voltage to the primary winding of the pulse transformer 101. The pulsed voltage is transferred between the stationary parts of the exciter assembly (i.e. the switched mode power supply 100 and the primary winding of the pulse transformer 101) to the rotating parts of the exciter assembly (i.e. the secondary winding of the pulse transformer 101 and the first and second power assemblies 103 and 104) across the air gap of the pulse transformer 101. The pulsed voltage is then transferred between the parts of the exciter assembly that are located in the warm environment (i.e. the switched mode power supply 100, the pulse transformer 101 and the first power assembly 103) and the parts of the exciter assembly that are located in the cold environment inside the cryostat 17 (i.e. the second power assembly 104) through the transfer leads 14. The field current supplied to the field winding 16 is regulated by stationary semiconductor devices within the switched mode power supply 100. Synchronous rectification of the field current is performed by devices within the first and second power assemblies 103 and 104. The first power assembly 103 does not normally regulate the field current but initiates commutation of the synchronous rectification of the field current if incipient quench of the field winding 16 is detected. The method by which incipient quench of the field winding 16 is detected will be described in more detail below.

The carrier frequency of the pulse width modulation is sufficiently high to minimise the size and dissipation of the pulse transformer, and also to permit structural attenuation to minimise the generation of structure-borne noise and vibration. If the pulse transformer is supplied at say 60 Hz, structural vibration in the pulse transformer will be excited at a series of harmonic frequencies having a fundamental frequency of 60 Hz, for example 60, 120, 180, 240 Hz and so on. Furthermore, the resultant ripple in the field current will also be composed of the same harmonic series and these will generate forces that will excite structural vibration in the machine. It is well known that structural responses to applied forces are strongly frequency dependant and complex, but are generally characterised by having resonance bands at particular frequencies where structural displacements are amplified. At frequencies well below the resonance bands, structural displacements stay constant as frequency is increased. At frequencies above the resonance bands, structural displacements are more significantly reduced as frequency is increased. As the excitation frequency is increased, the mechanisms of mass, compliance and damping cause beneficial structural attenuation. It is therefore beneficial to employ as high an excitation frequency as is practical. Moreover, it is beneficial for the excitation frequency to be adjustable so as to avoid coincidence of the excitation and structural resonant frequencies. A typical value for the carrier frequency of the pulse width modulation would be 8 kHz.

Figure 2:
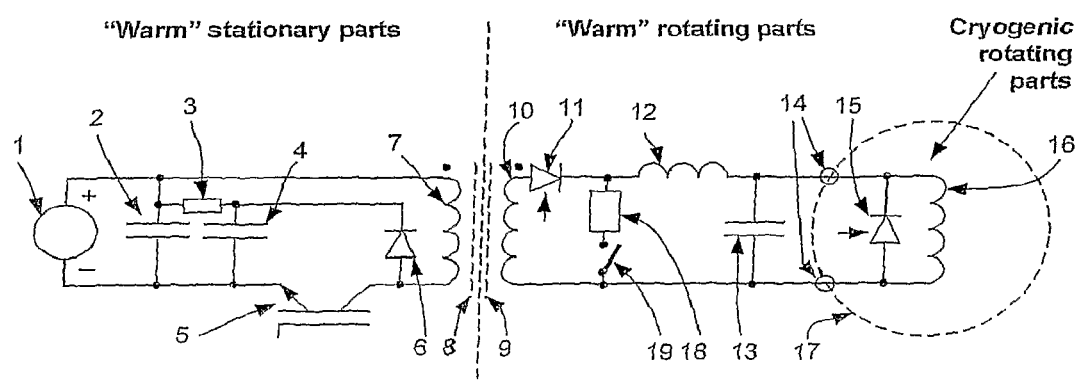
FIG. 2 is a schematic diagram showing the topology of the exciter assembly of FIG. 1 in detail.

The construction and operation of the exciter assembly will now be described in more detail with reference to FIG. 2. A switched mode power supply of the industry-standard "forward converter" (or Buck converter) type includes a dc voltage supply 1, a dc supply capacitor 2, a core reset resistor 3, a core reset capacitor 4, a switching transistor 5 and a core reset diode 6. The core reset components 3, 4 and 6 are only a typical industry-standard implementation and their actual design topology will be greatly dependent upon equipment rating, particularly the modulation range of the pulse width modulation employed by the switched mode power supply. In particular, when modulation depth increases, the reset voltage must also be increased so that the core reset volt-second integral is equal and opposite to the core set volt-second integral. The requirement to reset the core after each pulse of "forward conversion" imposes a practical restriction on the modulation depth and those conversant with switched mode magnetic circuit design will be aware of appropriate core reset techniques.

The switched mode power supply feeds a pulse width modulated regulated voltage to the pulse transformer having a primary winding 7, a primary magnetic core 8, a secondary magnetic core 9 and a secondary winding 10. The primary winding and magnetic core 7 and 8 are stationary while the secondary magnetic core and winding 9 and 10 rotate with the rotor of the machine. The primary and secondary magnetic cores 8 and 9 are separated by a small air gap. It will be readily appreciated that there is no requirement to provide an air gap between the magnetic cores 8 and 9, but even when the pole faces of the magnetic cores are in sliding contact with each other, pole face asperities prevent an intimate contact between them and a thin interface region with relatively low average magnetic permeability is formed having air gap-like characteristics. Since variations in the air gap characteristics would have an adverse effect on the performance of the pulse transformer, the alternative implementations described below maintain a controlled sliding interface between the primary and secondary magnetic cores.

The output of the secondary winding 10 of the pulse transformer is also a pulse width modulated voltage and is related to the voltage at the primary winding 7 according to the ratio of turns on the primary and secondary windings of the pulse transformer. Similarly, any current in the secondary winding 10 will be mirrored in the primary winding 7 according to the ratio of turns, and taking into account the fact that the primary winding will contain a magnetising current component having a predictable characteristic. The pulse width modulated voltage has two states, commonly referred to as the "mark" state and the "space" state, respectively. The "mark" state exists when the switching transistor 5 of the switched mode power supply is in its "on" state and the power supply voltage at the power supply capacitor 2 is applied to the primary winding 7 of the pulse transformer. The "space" state exists when the switching transistor is in its "off" state and the core reset components define the voltage that is applied to the primary winding 7 of the pulse transformer. The core of the pulse transformer is often stated as being "set" during the "mark" state and "reset" during the "space" state. It should be noted that the current pulses in the primary and secondary windings 7 and 10 of the pulse transformer are unidirectional, whereas the voltage reverses at "mark" state and "space" state transitions, as described above.

During start up of the machine it is necessary to bring the field current in the field winding 16 up to the required level. In ideal circumstances this might be achieved by applying a single voltage pulse lasting several minutes to "ramp up" the field current. However, in practice the application of a single voltage pulse for this length of time would quickly lead to saturation in the pulse transformer and so a series of shorter pulses must be applied over the same or a slightly longer period of time to ramp up the field current in a series of steps. Further practical limitations that may apply to the duration of the field current "ramp up" are:

(i) the field winding insulation capability;
(ii) the peak current rating of the switched mode power supply;
(iii) the short duration overload current rating of the pulse transformer; and
(iv) the thermal loading of the transfer leads 14.

Limitation (i) is not normally an overriding design issue because the field winding insulation must infrequently withstand the forcing voltage associated with incipient quench protection. Insulation life expectancy is non-linearly related to applied voltage and frequency, but is not an issue providing the period of time over which the "ramp up" takes place is many times longer than the "field discharge" time. Limitations (ii) and (iii) are simply issues of space availability and cost according to conventional design guidelines. Limitation (iv) is described in more detail below.

The field current in the field winding 16 will only dissipate very slowly when no voltage is applied. Therefore, once the field current has reached the acceptable level it is sufficient to apply a series of short voltage pulses at relatively long intervals (perhaps in the order of several minutes or hours) to keep the field current at the substantially the same level. This process is often referred to as "pumping" the field current. The exciter assembly must therefore be able to operate in two different modes, namely a "start up" mode where the field current is ramped up to an acceptable level and a "pumping" mode when the machine is operating normally and the level of the field current is maintained by supplying a number of short voltage pulses. The exciter assembly may also operate in a third mode (a "protection" or "dump" mode) when incipient quench is detected.

Figure 3:
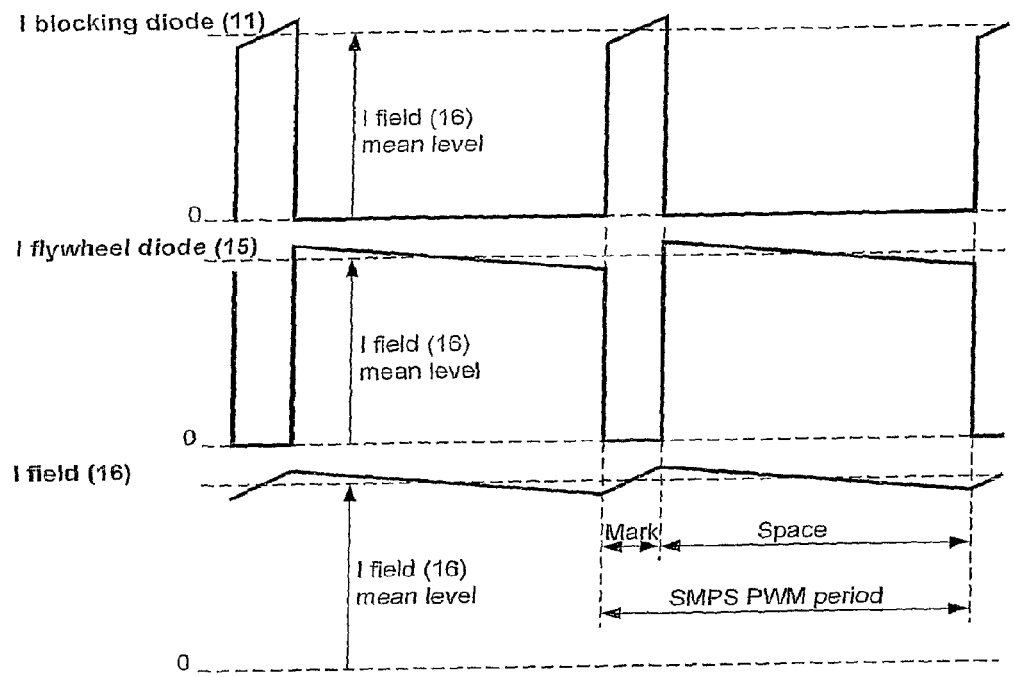
FIG. 3 is a diagram showing the pulse width modulated waveforms of the current flowing in the diode rectifier, flywheel diode and field winding.

The different operating modes of the exciter assembly will now be explained with reference to the pulse width modulated voltage supplied to the field winding 16. The period of time during which a voltage pulse is applied to the field winding 16 is the "mark" state and the period of time between voltage pulses is the "space" state. The first power assembly 103 includes a rectifier semiconductor device 11 and the second power assembly 104 includes a flywheel semiconductor device 15. The rectifier semiconductor device 11 and flywheel semiconductor device 15 are used in the synchronous rectification of the field current and have a general step-down (or "Buck") converter topology. The inductor 12 and capacitor 13 are used to eliminate the magnitude of higher frequency components of the pulse width modulated voltage supplied to the leads 14 by forming a low pass filter and thereby also acting as a snubber (switching aid network) for the rectifier semiconductor device 11 and the flywheel semiconductor device 15. This in turn limits the magnitude of higher frequency components of field current flowing in the field winding 16. During a "mark" state when the switching transistor 5 of the switched mode power supply is in the "on" state, the voltage pulse developed at the secondary winding 10 passes through the rectifier semiconductor device 11 and through the transfer leads 14 to the field winding 16. During a "space" state when the switching transistor 5 of the switched mode power supply is in the "off" state, the field current in the field winding 16 flows in a closed path through the flywheel semiconductor device 15. FIG. 3 shows how the field current (labelled "I field (16)") flows through the rectifier semiconductor device 11 during the "mark" state and then through the flywheel semiconductor device 15 during the "space" state. The bottom waveform shows how the field current in the field windings only dissipates very slowly during the "space" state when no voltage is applied.

The waveforms shown in FIG. 3 are for the exciter assembly operating in the "pumping" mode. When the exciter assembly is operating in the "start up" mode then it will be readily appreciated that the period of time between voltage pulses (or in other words the "space" state) will be greatly reduced so that the field current can be ramped up to the required level in a series of steps. The ratio of the period of time during which a voltage pulse is applied to the period of time between voltage pulses (i.e. the ratio of the "mark" state to "space" state) will therefore be different depending on whether the exciter assembly is operating in the "start up" mode or the "pumping" mode.

Instead of having to cope with the full field current, the transfer leads 14 only have to supply short pulses of voltage to the field winding 16 at fairly infrequent intervals when the exciter assembly is operating in the "pumping" mode. This leads to a reduction in the continuous rms stray heat transfer through the transfer leads 14. The limitation (iv) mentioned above is not severe because the transfer leads 14 are dimensioned to limit the continuous rms heat losses in order not to be dominant in cryo-plant rating and size. The thermal time constant of the bulk of the field winding 16 is many times the "ramp up" duration and transfer lead 14 current overloads do not have an immediate critical effect on the temperature of the field winding. However, care must be taken to avoid excessive heat input into the connection between the transfer leads 14 and the ends of the field winding 16. The risk of local overheating can be avoided by appropriate design of the cryogenic fluid cooling circuit that cools the interior of the cryostat. In any event, the transfer leads 14 must be able to withstand the field discharge current associated with incipient quench protection, and it is significant that the requirement for quench protection may be as a result of the failure of the cryogenic fluid cooling circuit.

Figure 4:
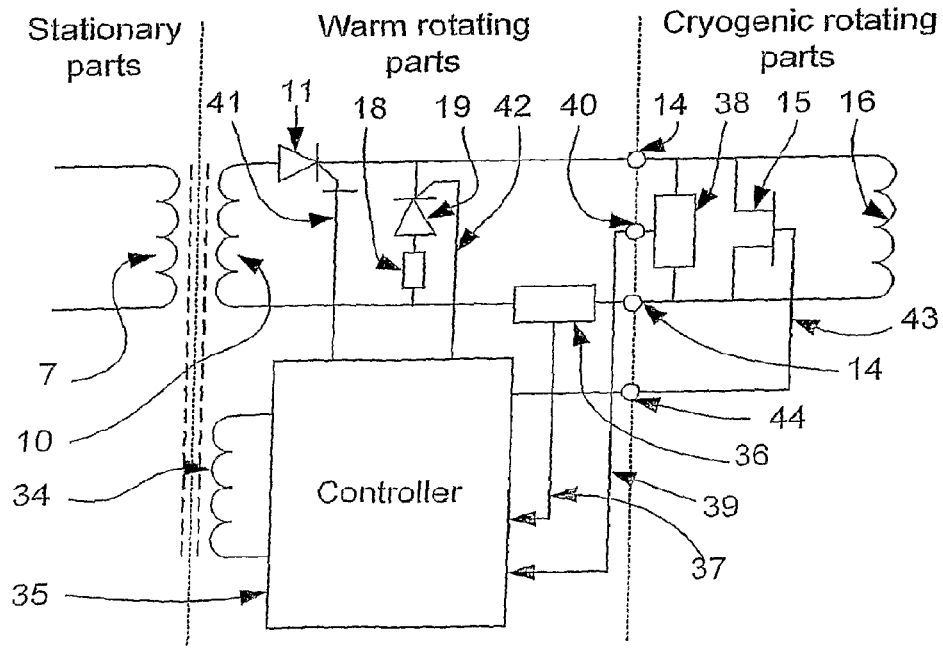
FIG. 4 is a schematic diagram showing the controller that is used control the operation of the exciter assembly of FIG. 1.

The control of the exciter assembly will now be described in more detail with reference to FIG. 4. The pulse transformer includes a tertiary winding 34 and the output from the tertiary winding is also a pulse width modulated voltage that is related to the voltage at the primary winding 7. A controller 35 uses the voltage at the tertiary winding as a power supply and a synchronisation reference.

As described above, the rectifier semiconductor device 11 and flywheel semiconductor device 15 are mainly used as synchronous rectifiers and have their gate pulses synchronised to the voltage output of the tertiary winding 34. The gate terminals of the rectifier semiconductor device 11 and the flywheel semiconductor device 15 also allow the controller 35 to initiate forced commutation when required.

The controller 35 synchronously samples a current feedback signal 37 that is derived from a current transducer 36 during the "mark" state. During the "mark" state the current in the transducer 36 is equivalent to the field current flowing in the field winding 16 and the controller 35 is therefore able to sense the field current throughout the "mark" state. The controller 35 also synchronously samples a voltage feedback signal 39 derived from a voltage transducer 38 during the "mark" state and the "space" state. The voltage feedback signal 39 is transferred between the cold environment and the warm environment by a lead 40. By locating the voltage transducer 38 next to the field winding 16, errors resulting from stray voltage drops outside the field winding 16 may be avoided, but it must be noted that care must be taken to avoid errors arising from thermocouple effects at voltage sensing connections. Alternatively, it is also possible to locate the voltage transducer 38 outside the cryostat as long as leakage current into the rectifier semiconductor device 11 and the semiconductor switch device 19 are sufficiently low not to cause excessive voltage drop in the transfer leads 14, and providing the controller 35 only samples the voltage feedback signal 39 during the "space" state. Locating the voltage transducer 38 outside the cryostat removes the need for the lead 40 with a corresponding simplification of the exciter assembly design.

The controller 35 uses the current feedback signal 37 and the voltage feedback signal 39 in combination with a suitable computational algorithm to estimate the resistance and the inductance of the field winding 16. These estimates are updated at the pulse width modulation carrier frequency of the switched mode power supply. The controller 35 compares the estimates with pre-determined values for the resistance and inductance in order to detect incipient quench of the HTS material in the field winding 16. If incipient quench is detected then the synchronous rectification of the rectifier semiconductor device 11 and the flywheel semiconductor device 15 is inhibited by turning off both of the devices by gate control.

When synchronous rectification is inhibited, the switched mode power supply will supply only magnetising current to the primary winding 7 of the pulse transformer. There is no requirement to cease operation of the switched mode power supply following inhibition of synchronous rectification because the rectifier superconductor device 11 can withstand the open circuit output voltage of the switched mode power supply as coupled by the pulse transformer. However, power supply shutdown can simply be implemented within the switched mode power supply if it is considered advantageous to do so. Moreover, there is no requirement for rotor telemetry to be provided in order to advise the operator or "trip" the switched mode power supply following the commencement of incipient quench protection, because the switched mode power supply is able to determine that synchronous rectification has been inhibited by sensing its load impedance. It is commonplace for switched mode power supply equipment to sense its output current and supply voltage and use these to determine the load impedance from a knowledge of modulation depth and an estimate of the magnetising current in the primary winding 7 of the pulse transformer. This allows the switched mode power supply to detect extremes of load impedance such as open circuit, for example.

When the rectifier semiconductor device 11 and the flywheel semiconductor device 15 are simultaneously turned off, the controller 35 can apply a gate pulse 42 to a switching device 19 whilst the voltage across the field winding 16 rises rapidly with a polarity that enables the switching device to conduct. The conduction of the switching device 19 causes the field discharge resistor 18 (sometimes called a dump resistor) to be connected in series with the field winding 16. The voltage drop across the resistor 18 causes the field current in the field winding 16 to decay approximately exponentially with respect to time. The resistance is determined according to a compromise between the insulation design and the fault dissipation constraints of the field winding 16. A small value of resistance causes the peak winding voltage to be restricted while the field current discharge time constant is increased. On the other hand, a large value of resistance causes the peak winding voltage to increase while the field current discharge time constant is reduced. The peak winding voltage influences the insulation design and the field current discharge time influences the fault dissipation in the HTS material. The relationship between these two influences can be beneficially altered by employing a non-linear resistance in place of the conventional field discharge resistor 18. A group of parallel-connected Metal Oxide Varistors (MOVs) or other non-linear surge arrester devices, with similar positive temperature coefficient of avalanche voltage and positive slope resistance, may be used to provide a substantially constant winding voltage during the field current discharge period. This has the effect of reducing the ratio of the fault dissipation in the HTS material with respect to the peak insulation voltage.

Figure 5:
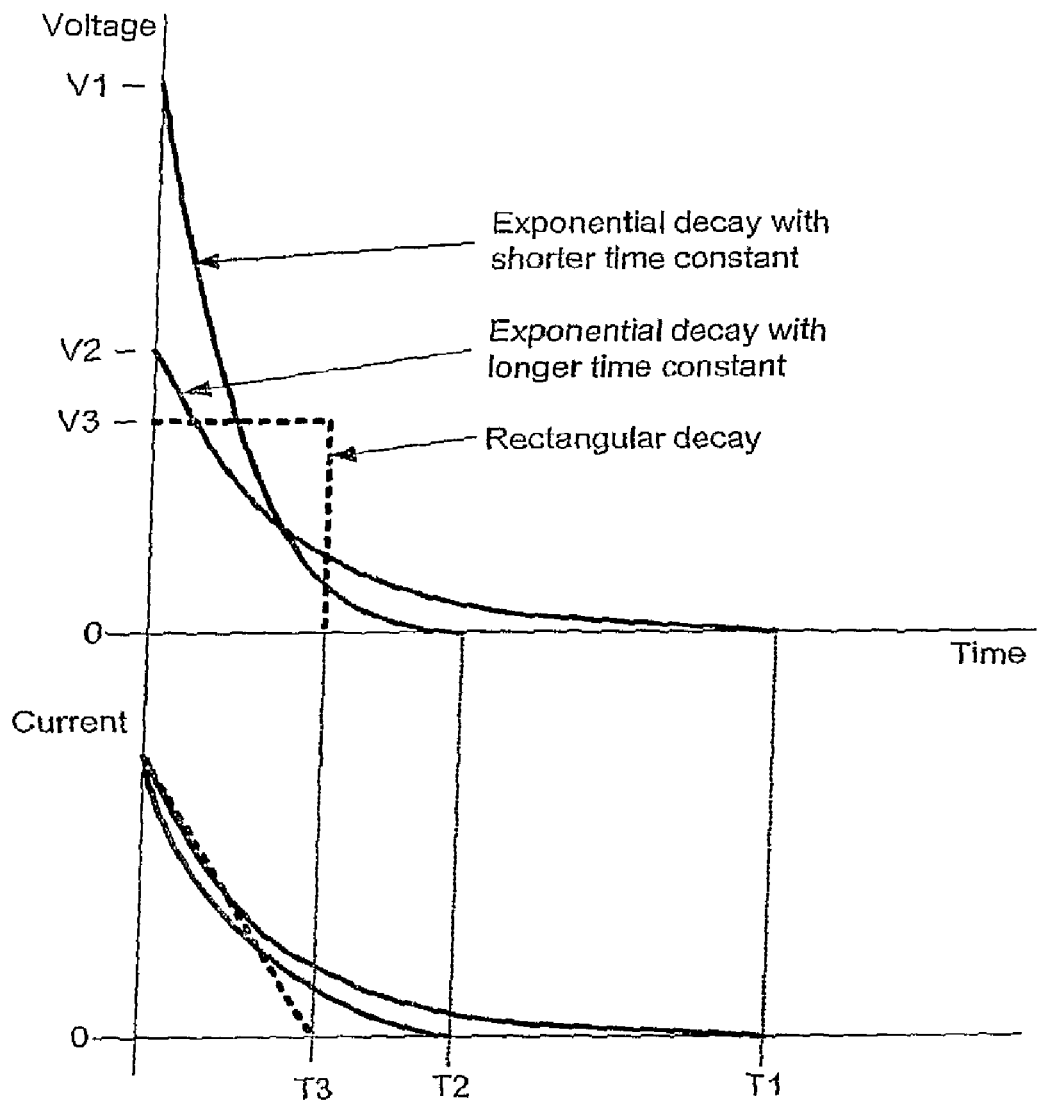
FIG. 5 is a diagram comparing the field winding voltage and current traces for two different field discharge resistors and a device having a non-linear resistance.

With reference to FIG. 5, when a linear resistor device (such as the field discharge resistor 18 mentioned above) is used for field discharge purposes then the field winding voltage and the current both decay exponentially with time. However, if a non-linear resistor device is used then the field winding voltage has a rectangular decay and the current decays according to a ramp with time. FIG. 5 shows three field winding voltage and current traces for three different resistor devices. The first trace (labelled "Exponential decay with shorter time constant") depicts the field winding voltage as it decays from an initial voltage V1 to zero in a time T2, as would be the case when a higher value field discharge resistor is employed. The second trace (labelled "Exponential decay with longer time constant") depicts the field winding voltage as it decays from an initial voltage V2 to zero in a time T1, as would be the case when a lower value field discharge resistor is employed. The third trace (shown in dashed lines and labelled "Rectangular decay") depicts the field winding voltage as it decays from an initial voltage V3 to zero at a time T3, as would be the case when a non-linear device is employed. Note that in the second trace the insulation stress has been reduced relative to the first trace because the peak voltage has been reduced from V1 to V2. However, the duration of the current decay shown below the voltage traces has been increased from T2 to T1, thus placing the field winding under greater thermal stress with a consequent risk of incipient quench. Note also that in the third trace, the peak voltage V3 is lower than both V1 and V2 and the duration of the current decay T3 is also the lower than both T1 and T2. The use of a non-linear resistor device in place of the field discharge resistor 18 therefore has the benefit of simultaneously reducing both the insulation stress and the thermal stress on the field winding.

The flywheel semiconductor device 15 can be a Junction Field Effect Transistor (JFET) or a Vertical Junction Field Effect Transistor (VJFET), which may be implemented as a depletion mode device or an enhancement mode device with synchronous gating being provided by the controller 35. In fact, a number of cryogenic switch implementations are possible and it is well known that majority carrier semiconductor devices have a positive thermal coefficient of "on" state voltage drop at temperatures above carrier freeze out, which occurs at approximately 50 degrees K in silicon devices. This positive thermal coefficient causes self-stabilisation and uniformity of "on" state current density over the whole die area. Moreover, the same effect causes parallel-connected groups of die to share current equally, providing cooling arrangements, interconnection geometry and gate drive arrangements are carefully specified in order to achieve thermal, mechanical and electrical symmetry. Such semiconductor devices also have a very high switching speed. The use of a JFET, VJFET or Metal Oxide Semiconductor Field Effect Transistor (MOSFET) under cryogenic conditions therefore facilitates the fabrication of large die area switches with very low dissipation, high current rating and high switching speed.

The rectifier semiconductor device 11 and switching device 19 can be a thyristor, Gate Turn Off Thyristor (GTO) or any other suitable semiconductor device with similar reverse blocking and gate turn on characteristics. Except when synchronous rectification of the rectifier semiconductor device 11 and the flywheel semiconductor device 15 must be inhibited by turning off both devices by gate control, the phase relationship of the gate pulse 43 applied to the flywheel semiconductor device 15 by the controller 35 is synchronised to the operation of the secondary winding 10 of the pulse transformer and the rectifier semiconductor device 11 because of the precise phasing of the tertiary winding 34 of the pulse transformer with respect to the secondary winding. Similarly, the phase relationship of the gate pulse 41 applied to the rectifier semiconductor device 11 by the controller 35 is synchronised to the operation of the secondary winding 10 of the pulse transformer and the flywheel semiconductor device 15 because of the precise phasing of the tertiary winding 34 of the pulse transformer with respect to the secondary winding 10.

When the flywheel semiconductor device 15 is a depletion mode device it will revert to its naturally "on" state except when the gate pulse 43 is applied to switch it to its "off" state. Gate pulses 41 and 43 are applied simultaneously and by this means simultaneous conduction of semiconductor devices 11 and 15 is avoided. When the flywheel semiconductor device 15 is an enhancement mode device it will revert to its naturally "off" state except when the gate pulse 43 is applied to switch it to its "on" state. Gate pulses 41 and 43 are applied in anti-phase and by this means simultaneous conduction of semiconductor devices 11 and 15 is avoided.

The gate pulse 43 is transferred between the cold environment and the warm environment by a lead 44.

The active incipient quench protection described above is particularly advantageous because the detection can be performed very rapidly at the pulse width modulation carrier frequency. It will be readily appreciated that the HTS material in the rotor windings may also be provided with passive protection, perhaps in the form of a buffer layer of copper for example.

The pulse transformer may be implemented in a number of different ways and some of the alternatives will now be described. In all cases, the primary system (i.e. the primary winding and its associated magnetic core) is stationary and is located in the warm environment and the secondary system (i.e. the secondary winding and its associated magnetic core) rotates with the rotor of the machine and is located in the warm environment.

A variety of different pulse transformer will now be described with reference to FIGS. 6 to 9. All of the magnetic circuits below are formed from ferrite material.

Figure 6A:
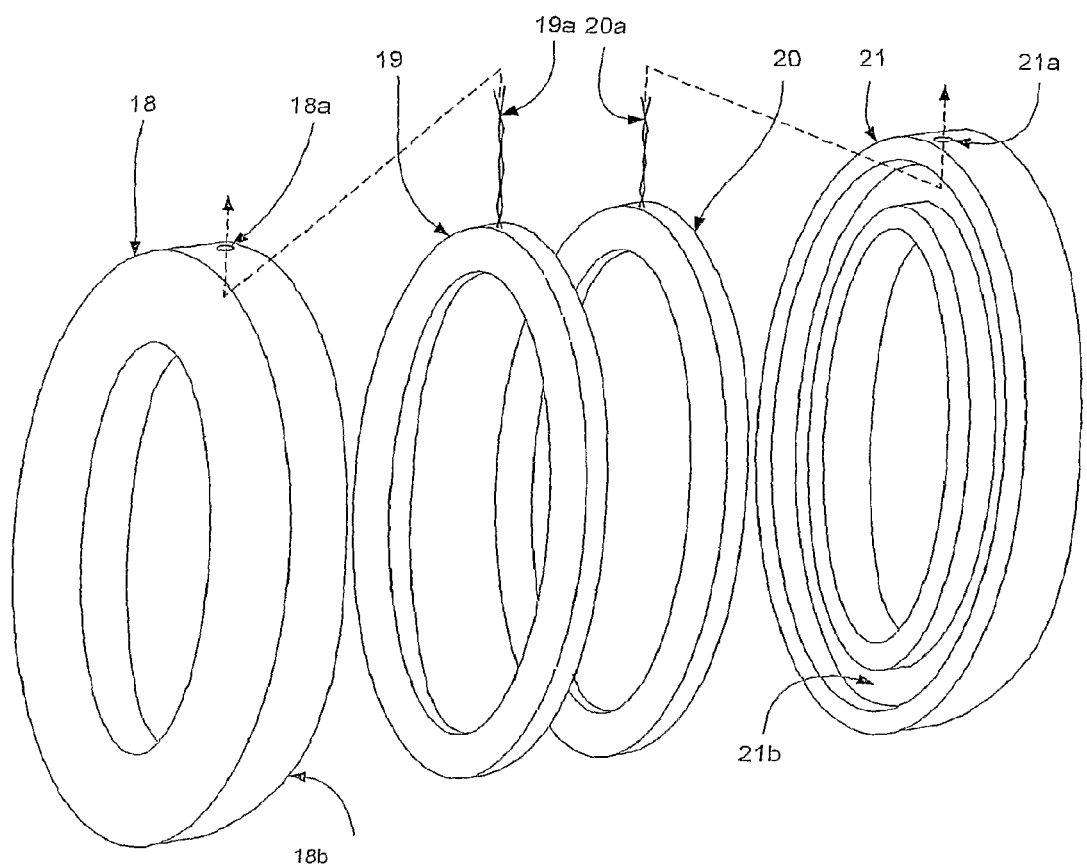
FIG. 6A is a perspective view of a first pulse transformer.
Figure 6B:
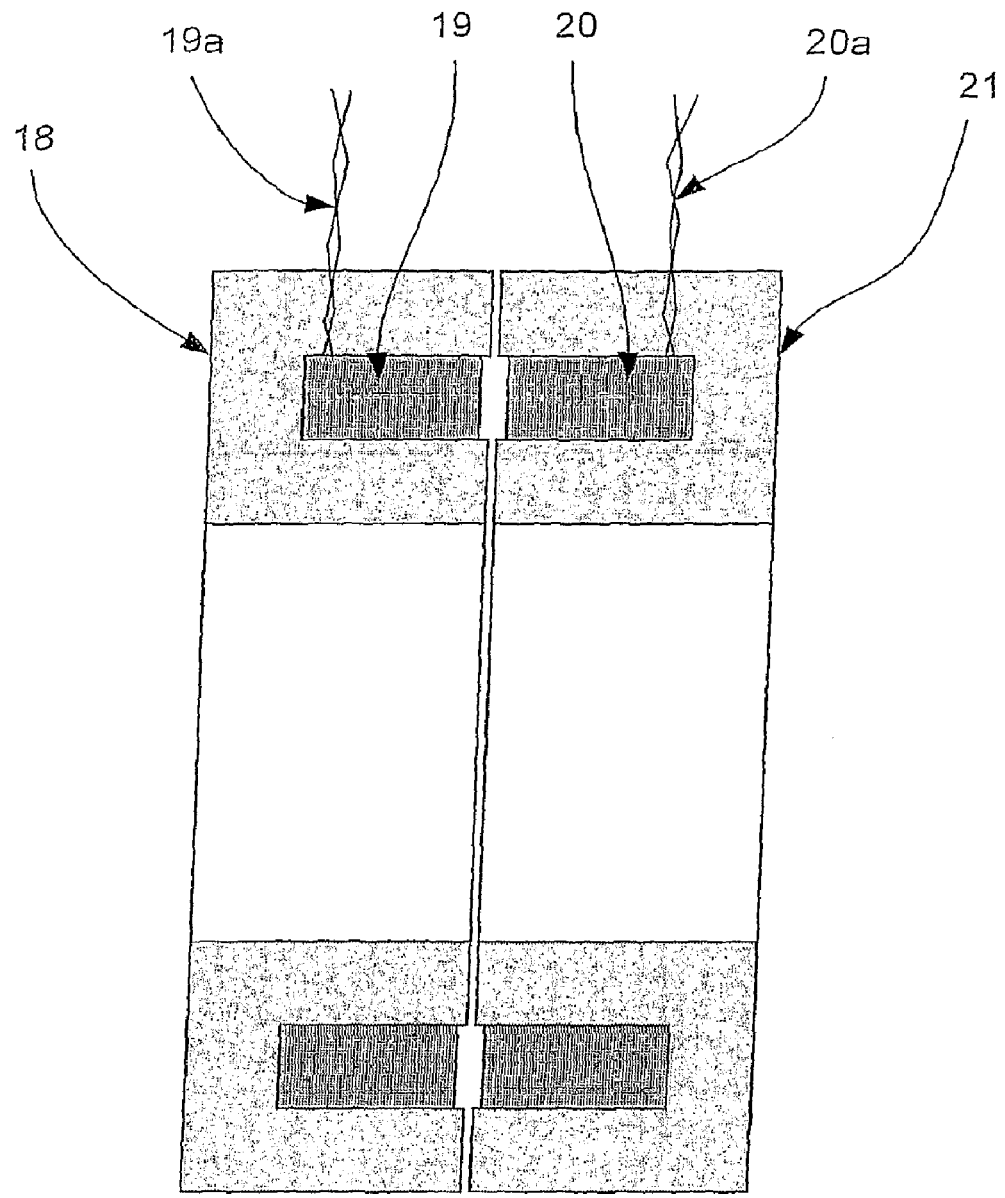
FIG. 6B is a cross section of the pulse transformer of FIG. 6A.

Referring first to FIGS. 6A and 6B, a first pulse transformer includes a primary core 18 which is a U-section solid of revolution to provide a cavity 18b into which a solenoidal primary winding 19 is inserted. The primary connections 19a are accessible via a recess or aperture 18a in the primary core 18. The first pulse transformer also includes a secondary core 21 which is a U-section solid of revolution to provide a cavity 21b into which a solenoidal secondary winding 20 is inserted. The secondary connections 20a are accessible via a recess or aperture 21a in the secondary core 21.

Figure 7A:
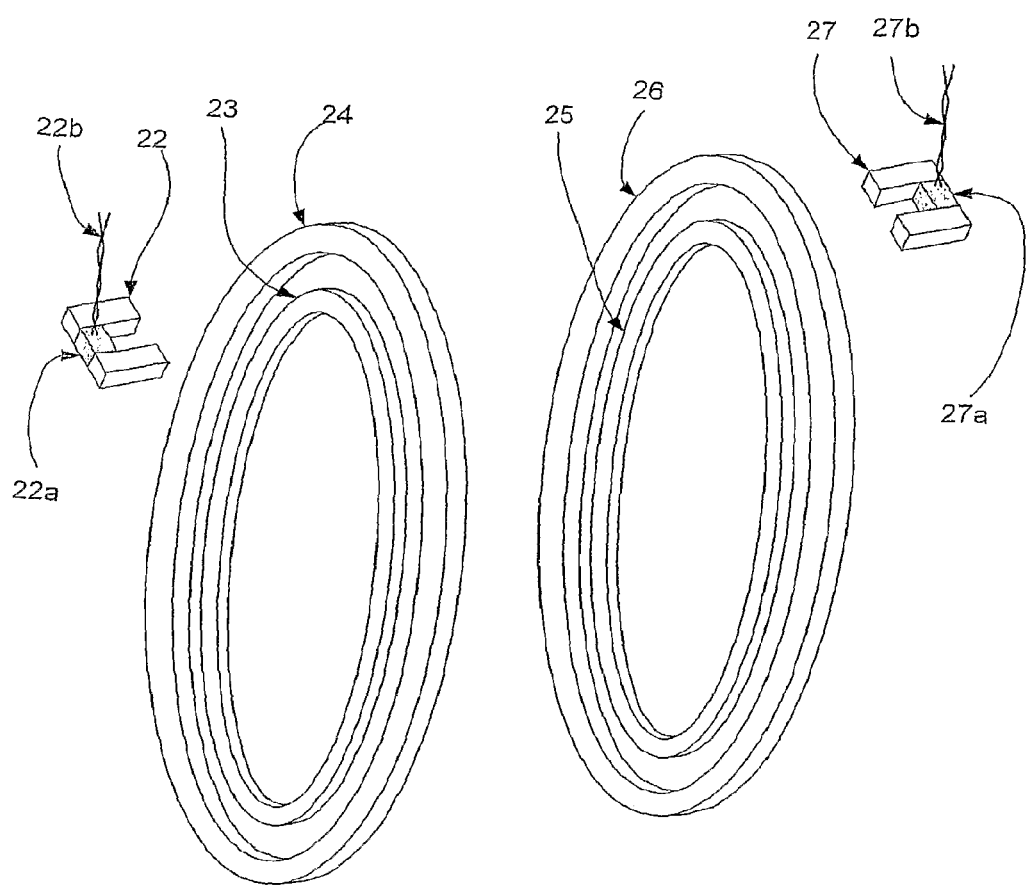
FIG. 7A is a perspective view of a second pulse transformer.
Figure 7B:
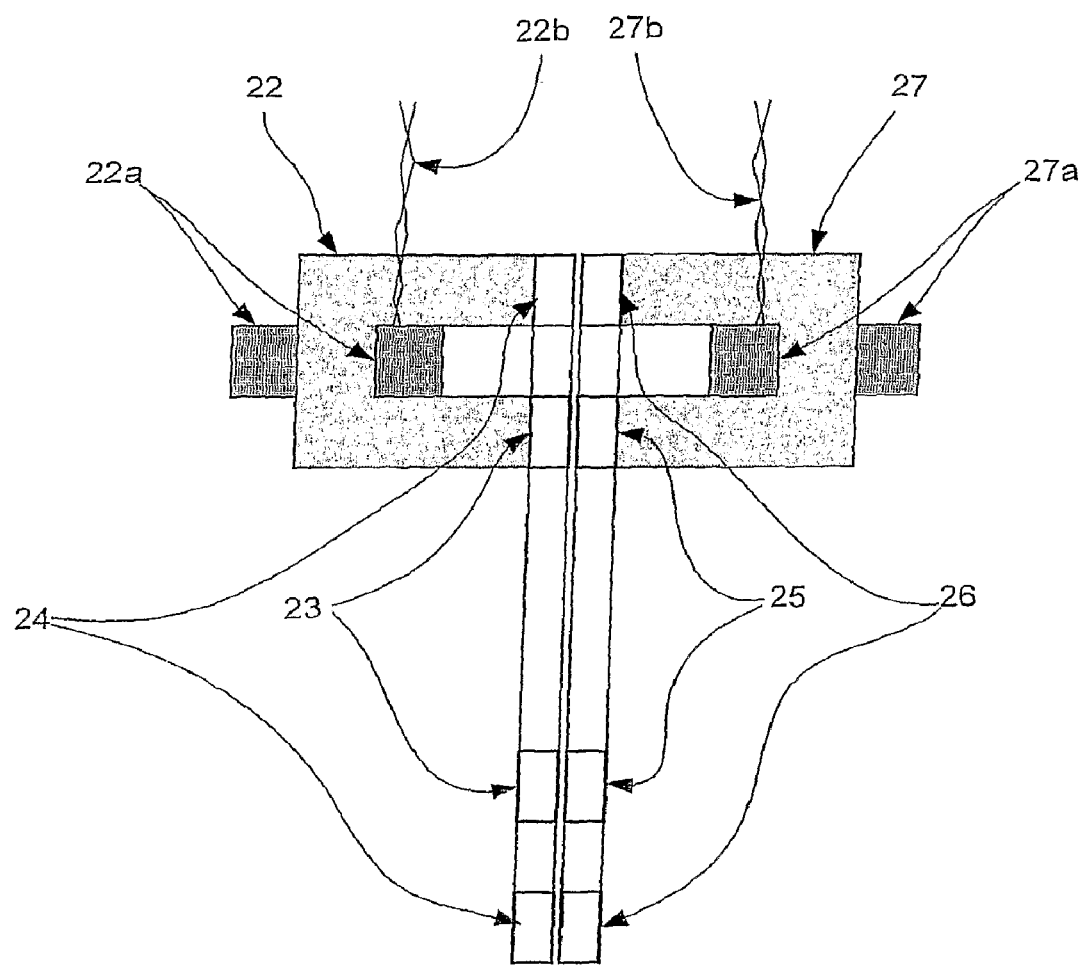
FIG. 7B is a cross section of the pulse transformer of FIG. 7A.

Referring now to FIGS. 7A and 7B, a second pulse transformer includes an industry-standard U-shaped primary core 22. A solenoidal primary winding 22a is formed around the core 22. Two concentrically disposed primary pole piece rings 23 and 24 are formed from similar ferrite material and are connected to the core 22 in order to distribute the flux from the pole faces of the core. A single core 22 is shown but in practice several cores may be connected to the pole piece rings 23 and 24 in order to reduce the circumferential component of flux in the pole piece rings. Primary connections 22b are brought out of the winding 22a. The second pulse transformer also includes an industry-standard U-shaped secondary core 27. A solenoidal secondary winding 27a is formed around the core 27. Two concentrically disposed secondary pole piece rings 25 and 26 are formed from similar ferrite material and are connected to the core 27 in order to distribute the flux from the pole faces of the core. A single core 27 is shown but in practice several cores may be connected to the pole piece rings 25 and 26 in order to reduce the circumferential component of flux in the pole piece rings. Secondary connections 27b are brought out of the winding 27a. When multiple primary and secondary cores 22 and 27 are employed then they are regularly spaced in order to reduce the circumferential component of flux in the primary and second pole piece rings. The axial and radial positions of the primary and secondary components of the second pulse transformer are regulated in order to maintain acceptable air gap, friction and wear characteristics. The second pulse transformer shown in FIGS. 7A and 7B is fully symmetrical but it is also possible that unequal numbers of primary and secondary cores can be used in order to reduce the effects of cyclic variation in the flux linkage when the rotating cores are in motion.

Figure 8A:
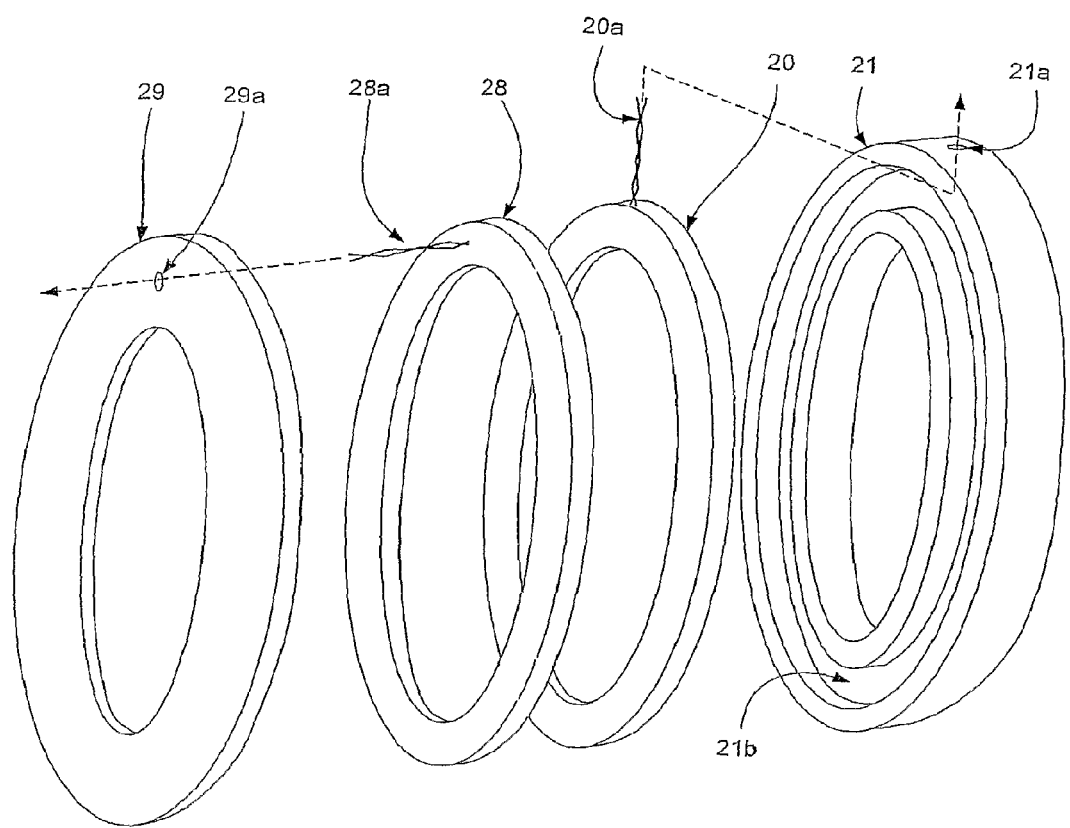
FIG. 8A is a perspective view of a third pulse transformer.
Figure 8B:
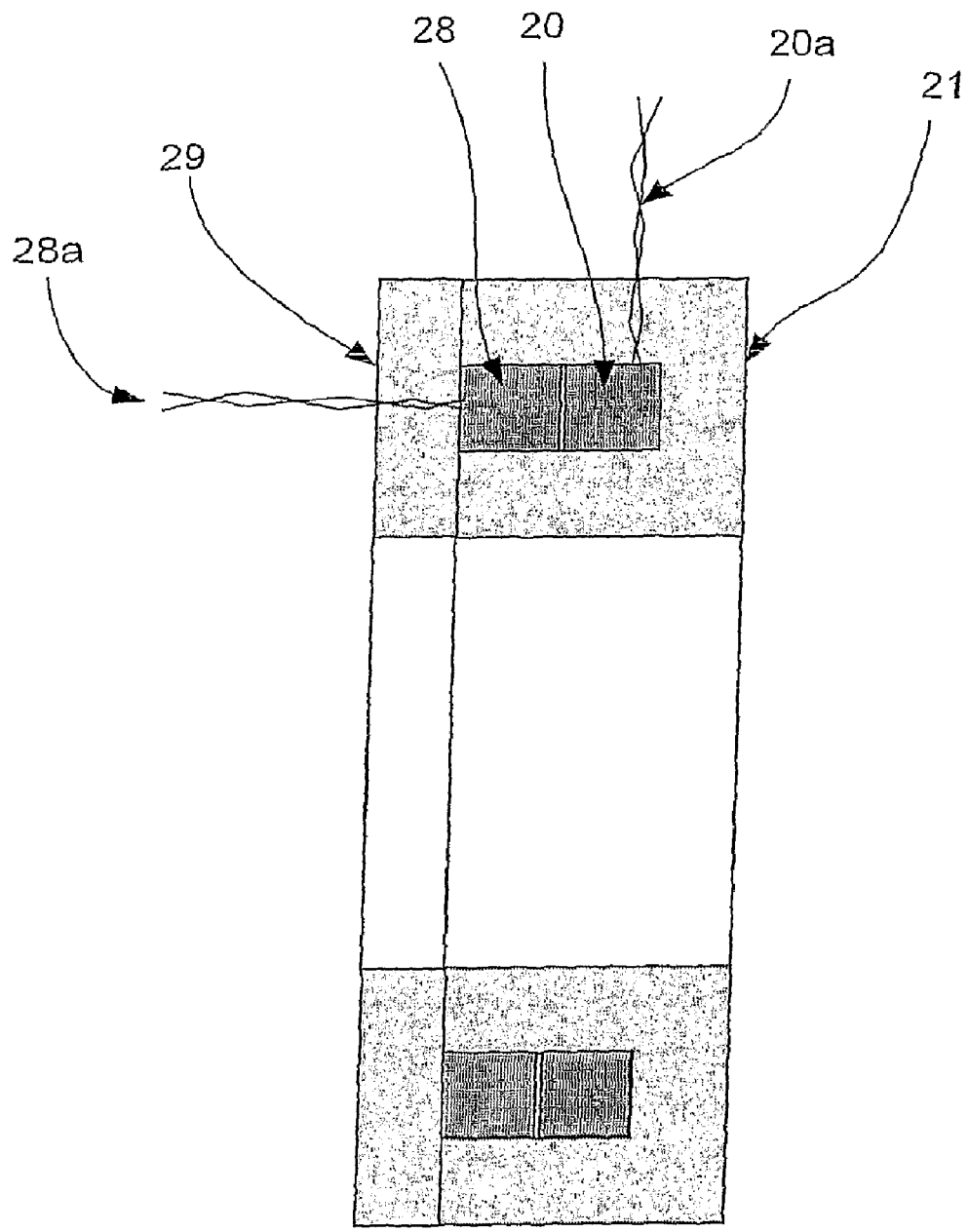
FIG. 8B is a cross section of the pulse transformer of FIG. 8A.

The third pulse transformer shown in FIGS. 8A and 8B is an asymmetrical variant of the first pulse transformer where the primary core 18 is replaced by ring core 29 of rectangular radial cross section. In this case, the solenoidal primary winding 28 is housed within the cavity 21b of the secondary core 21, adjacent to the secondary winding 20. The axial positions of the primary and secondary windings 28 and 20 are regulated in order to avoid friction and wear because they are in close proximity to one another.

Figure 9A:
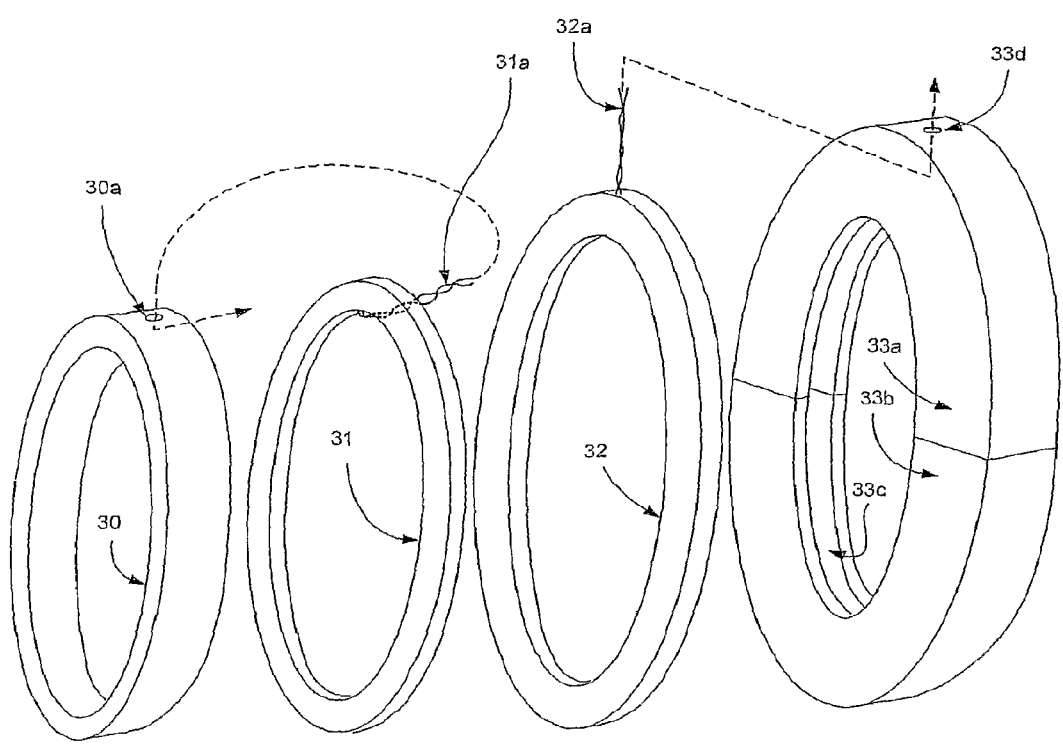
FIG. 9A is a perspective view of a fourth pulse transformer.
Figure 9B:
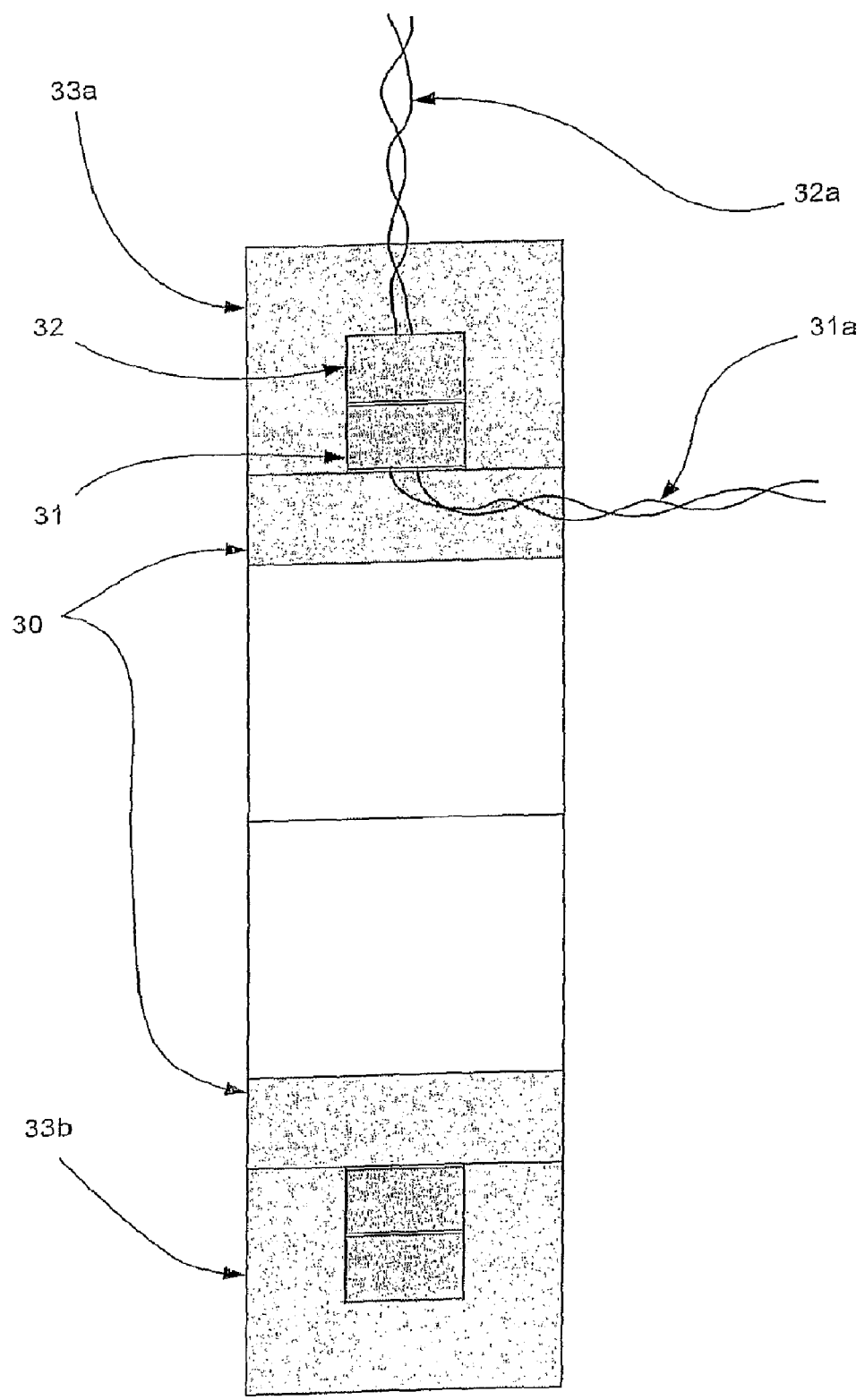
FIG. 9B is a cross section of the pulse transformer of FIG. 9A.

Referring now to FIGS. 9A and 9B, a fourth pulse transformer has an outer core which is a U-section solid of revolution formed in two mating sections 33a and 33b. The core provides a cavity 33c into which concentrically disposed primary and secondary solenoidal windings 31 and 32 are inserted. The magnetic circuit is completed by an inner ring core 30. The primary connections 32a are accessible via a recess of aperture 33d in the core section 33a. The secondary connections 31a are accessible via a recess or aperture 30a in the inner ring core 30. The axial and radial positions of the primary and secondary cores are regulated in order to maintain acceptable air gap, friction and wear characteristics. The axial and radial positions of the primary and secondary windings 31 and 32 are also regulated to avoid friction and wear because they are in close proximity to one another and to the walls of the cavity 33c.

The invention claimed is:

1. A superconducting synchronous machine having rotor windings formed from a superconducting material, and an exciter assembly for supplying a field current to the superconducting rotor windings, the exciter assembly comprising:
   a pulse transformer having a primary winding, a secondary winding and a tertiary winding;
   a switched mode power supply for supplying a primary pulsed ac voltage to the primary winding of the pulse transformer;
   a rectifier for deriving a pulsed dc voltage by synchronous rectification of a secondary pulsed ac voltage supplied by the secondary winding of the pulse transformer;

a pair of transfer leads for supplying the pulsed dc voltage derived by the rectifier to the superconducting rotor windings; and a controller for controlling synchronous rectification of the secondary pulsed ac voltage by the rectifier based on a signal from the tertiary winding of the pulse transformer.

2. The superconducting synchronous machine of claim 1, wherein the superconducting rotor windings are located in a cryogenic region.

3. The superconducting synchronous machine of claim 2, wherein the primary winding and the secondary winding of the pulse transformer are located outside the cryogenic region.

4. The superconducting synchronous machine of claim 2, wherein the switched mode power supply is located outside the cryogenic region.

5. The superconducting synchronous machine of claim 2, wherein the rectifier comprises a rectifier semiconductor device in series with the superconducting rotor windings and a flywheel semiconductor device in parallel with the superconducting rotor windings.

6. The superconducting synchronous machine of claim 5, wherein the rectifier semiconductor device is located outside the cryogenic region.

7. The superconducting synchronous machine of claim 5, wherein the flywheel semiconductor device is located inside the cryogenic region.

8. The superconducting synchronous machine of claim 1, wherein the superconducting rotor windings are formed from a high temperature superconducting (HTS) material.

9. The superconducting synchronous machine of claim 1, wherein the superconducting rotor windings include means for protecting the superconducting rotor windings against damage in the event of incipient quench.

* * * * *